March 10, 1936.  J. T. WORTHINGTON  2,033,567
SYSTEM FOR ELECTRIC DEHYDRATION
Filed Feb. 6, 1933
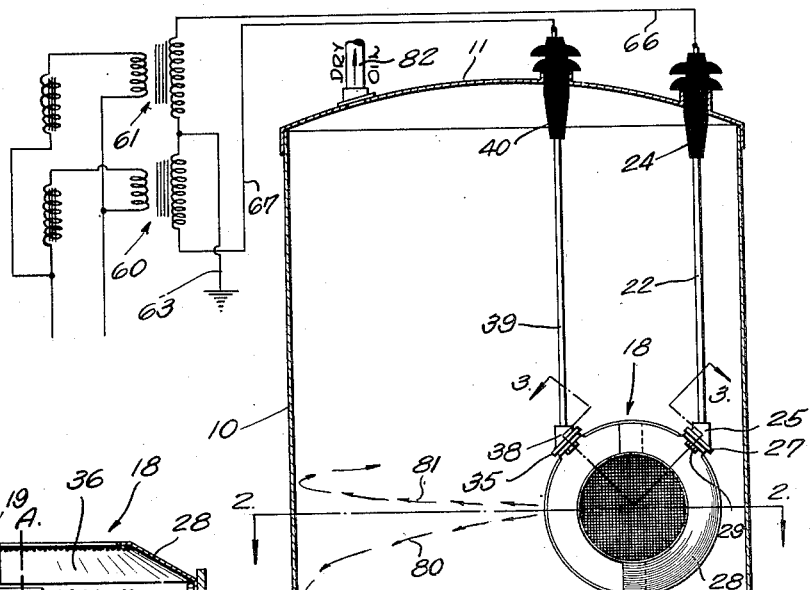
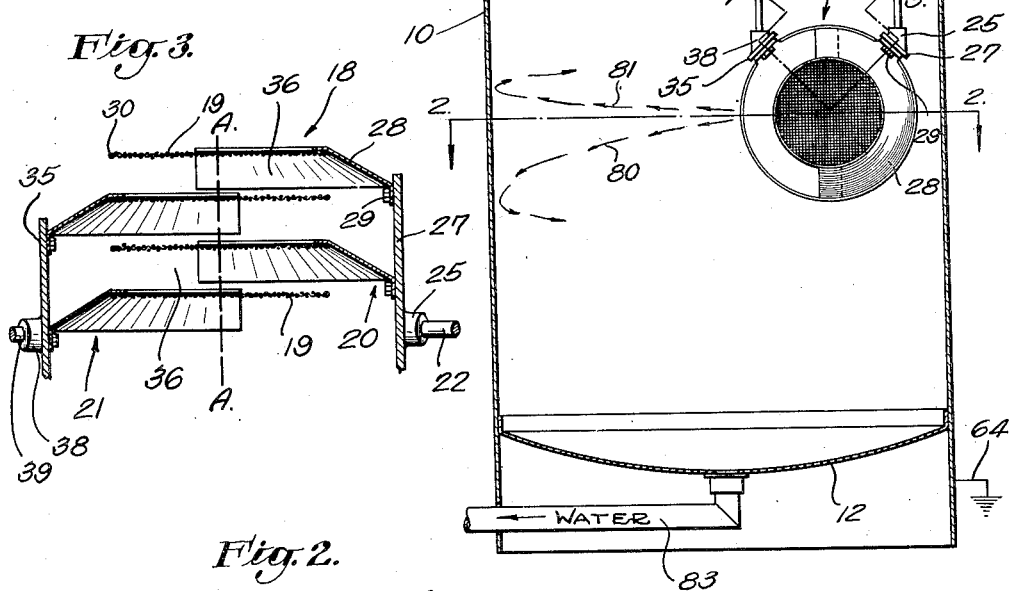
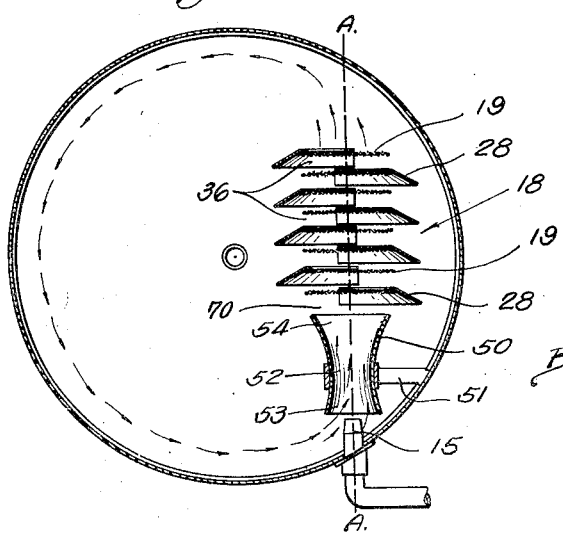
INVENTOR:
JOHN T. WORTHINTON,
By Fred W. Davis
ATTORNEY.

Patented Mar. 10, 1936

2,033,567

UNITED STATES PATENT OFFICE 2,033,567

SYSTEM FOR ELECTRIC DEHYDRATION

John T. Worthington, Long Beach, Calif., assignor to Petroleum Rectifying Company of California, Los Angeles, Calif., a corporation of California Application February 6, 1933, Serial No. 655,394

12 Claims. (Cl. 204—24)

My invention relates to electric treaters of the type capable of breaking emulsions. More particularly the present treater finds utility in the dehydration of crude oil emulsions. It is in this capacity that the treater will be particularly described, without limiting myself thereto.

Such petroleum emulsions are usually of the water-in-oil type, and one method at present in wide use in separating the phases of such an emulsion is to subject the emulsion to the action of a high intensity electric field which acts to coalesce the dispersed water particles into masses of sufficient size to gravitate from the oil. Many present-day electric treaters allow separation to take place in the electric field. The result is that the capacity of the treater is often materially decreased due to the fact that separation takes place at a relatively slow rate.

It is an object of the present invention to provide a novel method of treatment as well as a new form of treater in which the emulsion is forced completely through the electric field before material separation of the constituents takes place, the separation being effected at a position outside the main field.

It is another object of the present invention to form an electric field by the use of a plurality of interstitial electrodes, and to force the material to be treated through the treating space defined therebetween.

If two or more interstitial members are disposed in substantially parallel relationship and insulated from each other, an electric field set up therebetween may be represented by lines of force extending transversely across the treating space between the electrodes. It is an object of the present invention to force a stream of liquid to be treated through this treating space in a direction which is substantially parallel to these lines of force.

In the preferred embodiment this is accomplished by forcing the liquid through each of the interstitial electrodes and through the treating space therebetween at a relatively high velocity so that no material separation takes place until after the liquid is discharged from the electrode system, and such a system is an important feature of the present invention.

It is a further object of the invention to not only set up an electric field between such interstitial electrodes, but in addition to establish an auxiliary field between these electrodes and the emulsion-introduction structure.

It is a further object of the invention to mix the incoming emulsion with some other liquid prior to the entry of this mixture into the electric field, and in accomplishing this object, I prefer to intermix the incoming emulsion with a portion of the dry or partially dry oil which has already separated. The apparatus and method whereby this mixing takes place is also novel.

It is a further object of the invention to provide one or more guides at or near the interstitial electrodes so positioned as to guide the incoming liquid in a somewhat sinuous path which transverses substantially all of these electrodes. Still a further object of the invention lies in the establishment of electric fields between these deflectors themselves.

A further object of the invention is to position the electrode structure in a tank, and introduce the emulsion tangentially into this tank so as to set up a rotation therein, the electrode structure being so positioned with respect to the tank that this rotation forces liquid therethrough.

Still further objects of the invention lie in the novel treating methods involved, and other objects and advantages of the invention will be evident to those skilled in the art from the following description.

The figures of the drawing, taken together, illustrate the preferred embodiment of the invention.

Fig. 1 illustrates a vertical sectional view of the treater.

Fig. 2 is a cross-sectional view taken on the line 2—2 of Fig. 1.

Fig. 3 is a cross-sectional view taken on the line 3—3 of Fig. 1.

Referring particularly to Fig. 1 the treater is shown as including a tank 10 provided with upper and lower heads 11 and 12. An emulsion inlet nozzle 15, best shown in Fig. 2, extends tangentially into the tank 10 and forces a stream of emulsion thereinto. During the operation of the treater the interior of this tank 10 is substantially filled with a liquid and the tangential discharge of the incoming emulsion acts to set this liquid into rotation.

Positioned in the tank 10 so as to be in the path of this rotating liquid, and also to be directly in the path of the emulsion introduced through the nozzle 15, is an electrode structure 18 of novel construction. This electrode structure comprises a plurality of interstitial electrodes 19 which may be conveniently made of metallic screen. It is preferable though not invariably necessary, to mount these interstitial electrodes in a vertical position, and to so position them that they are in substantially parallel relationship. Alternate electrodes are electrically connected together to form a primary series 20, while the remainder of the electrodes are connected together to form a secondary series 21.

All of the electrodes of the primary series 20 are suspended on a rod 22 extending through an insulator 24. This may most conveniently be accomplished by connecting the lower end of the rod 22 to a hub 25 which supports an arm 27 extending tangentially with respect to the tank 10. Several deflectors 28 are secured to the arm 27 as by bolts 29. Each deflector is of a general U-shaped form and carries one of the interstitial electrodes 19. Each interstitial electrode 19 may most conveniently be of circular shape, and can be formed of a perforated plate or from coarse-mesh screen, the opening in the plate or screen being of sufficient size so that no large back pressure exists against the emulsion stream. A reinforcing ring 30 is welded or otherwise secured to the periphery of the interstitial electrode, and this ring is connected to the deflector 28 in any suitable manner, as by welding.

In the preferred embodiment of the invention each deflector 28 extends slightly more than half way around the periphery of the interstitial electrode 19 and is of general frusto-conical form so as to deflect the liquid toward and through the interstices of the interstitial electrode attached thereto. From a reference to Figs. 2 and 3, it will be clear that the primary series 20 of the interstitial electrodes is composed of a plurality of these deflectors and attached interstitial electrodes secured along the arm 27 in spaced relationship.

The secondary series 21 of these interstitial electrodes is similarly formed and includes a plurality of deflectors 28 secured to an arm 35, each deflector carrying one of the interstitial electrodes 19 in a manner previously described. From a reference to Figs. 2 and 3 it will be clear that the interstitial electrodes of the secondary series 21 are interspaced between the electrodes of the primary series 20, and, in the preferred embodiment, these electrodes are all aligned along a common axis indicated by the line A—A of Fig. 3, this axis being also of the axis of the stream of emulsion discharged from the nozzle 15. The adjacent interstitial electrodes 19 thus cooperate in defining a plurality of treating spaces 36 through which the incoming emulsion discharged from the nozzle 15 is forced in succession. Due to the construction of the deflectors it will be clear that the end portions of adjacent deflectors slightly overlap, thereby insuring that any particle of liquid at any peripheral position immediately outside the screen electrodes will be guided through these screen electrodes by the deflectors.

The arm 35 of the secondary series 21 is connected to a hub 38 and supported on a rod 39 in a manner previously described, this rod extending through an insulator 40. The whole electrode structure 18 is mounted to one side of the vertical axis of the tank 10, as best shown in Figs. 1 and 2. The inevitable result is that the body of liquid rotating in the tank 10 will tend to move through the interstitial electrodes and through the treating spaces 36.

It will thus be clear that in the absence of any additional structure both the incoming emulsion and the liquid in the tank will be circulated through the treating spaces in succession.

However, with certain types of emulsion I find it more desirable to more intimately intermix the incoming emulsion and the liquid in the tank prior to the time that these constituents move into the first treating space 36. Possibly the simplest way of accomplishing this end is to utilize a mixing tube 50, best shown in Fig. 2, and supported on a bracket 51 which also serves to electrically connect the tube 50 to the tank. This tube is concentric with the axis A—A and is preferably spaced a distance from the inner end of the nozzle 15. The incoming stream of emulsion discharging from the nozzle 15 will tend to draw the liquid in the tank into the tube 50. By proper design it is possible to obtain quite an intimate mixture between the incoming emulsion and this liquid, this mixture taking place inside the tube 50. In other instances the nozzle and mixing tube can be designed to effect a less intimate mixture, and it is sometimes advisable to allow the emulsion stream to spread out so that it covers practically the whole surface of the electrodes 19. In this connection the nozzle 15 can be designed to thus spread the emulsion across the whole face of each of these electrodes, even if the mixing tube 50 is not used. In the preferred embodiment I prefer to make the mixing tube 50 of the shape shown, this tube being in the form of a Venturi-tube and having a restricted throat 52, an intake portion 53, and a discharge portion 54. The discharge portion is in spaced relationship with the first interstitial electrode, but directs the liquid toward the first treating space 36.

Electric fields can be established in the treating spaces 36 by directly connecting a high voltage secondary winding of a transformer across the rods 22 and 39, one terminal of this winding being also connected to the tank. With such a system, however, either the primary series 20 or the secondary series 21 must be at ground potential. In the preferred embodiment of the invention I prefer to maintain both of these series at a potential above ground and for this purpose utilize two transformers respectively indicated by the numerals 60 and 61. Two terminals of the secondary windings of these transformers are interconnected and grounded through a conductor 63, the tank 10 being also grounded as indicated by the numeral 64. The remaining terminal of the secondary winding of the transformer 61 is connected to the rod 22 through a conductor 66. Similarly, a conductor 67 connects the remaining terminal of the secondary of the transformer 60 to the rod 39. These secondary windings are connected in additive relation so that the potential between adjacent interstitial electrodes 19 will be the sum of the potentials produced by the transformers. So also, high potential differences will be maintained between the deflectors so that additional treatment takes place therebetween.

On the other hand, the potential between any particular interstitial electrode 19 and the tank, or other grounded element will be only one-half of this value if the transformers 60 and 61 are identical. Thus, in addition to the main fields established in the treating spaces 36, certain auxiliary fields will be present around each deflector 28 and between this deflector and the tank. Even more important, however, is the fact that an auxiliary field is formed in the space indicated by the numeral 70 between the discharge portion 54 of the mixing tube 50 and the first interstitial electrode 19. This auxiliary field in the space 70 acts to preliminarily treat the emulsion prior to its passage through the main treating spaces 36.

It will be noted, however, that with the construction shown there is no field between the nozzle 15 and the tube 50. This is a novel feature, for when such tubes have heretofore been used for mixing purposes the tubes have been maintained at a potential difference from the potential of the nozzle. In the present invention the preliminary mixing is accomplished in the absence of an electric field.

In the normal operation of this treater, it is desirable to maintain a sufficient velocity through the treating spaces 36 to prevent any material separation taking place therein. However, as soon as the material discharges from the last treating space it is moved tangentially in the tank and the water tends to settle as indicated by the arrows 80 of Fig. 1. The dry oil tends to slowly rise as indicated by the arrows 81. This rising of the oil is, however, relatively slow and the net result is that after the oil has made a complete circuit of the tank, it will not have moved upward beyond the influence of the mixing tube 50. Thus, this dry or partially dry oil is drawn into the mixing tube and to some extent mixed with the incoming emulsion, being again forced through the treating spaces 36. This recycling of the liquid in the tank is an important feature of the invention and insures that complete coalescense will be effected. Eventually the completely treated dry oil will move to the upper end of the tank 10 and be withdrawn through the pipe 82, while the water will drop to the bottom of the tank and form a body of water which can be withdrawn through a pipe 83.

It is sometimes possible to completely eliminate the interstitial electrodes, the fields set up between adjacent deflectors being sufficient. With such a structure the treatment will take place as the emulsion is guided from one deflector to another, the emulsion thus moving in a somewhat sinuous path from deflector to deflector.

While I have disclosed but one electrode structure 18 in the tank 10, it will be clear that a duplicate structure can be installed in the tank on the opposite side of the axis thereof. If such a combination is used it is possible to utilize the second electrode structure merely as an auxiliary treater. On the other hand, another nozzle 15 can be installed, in which event incoming emulsion will be supplied to the tank at two sections. Further electrode structures may be installed if desired.

While I have disclosed two transformers 60 and 61, it will be clear that this combination is not essential to the operativeness of the apparatus. A single transformer may be utilized if desired, and if it is desired to maintain a higher potential across the treating spaces 36 than is present between the electrodes and the tank, such a single transformer can be center-tapped to accomplish the same function as the transformers 60 and 61.

Certain of the subject matter herein disclosed is claimed in the co-pending application of Harold C. Eddy Serial No. 655,556, entitled "Method of and apparatus for treating petroleum", the present application being directed to an improvement of the structure disclosed and claimed in said application.

I claim as my invention:

1. In an electric treater for treating emulsions, the combination of: a pair of vertically disposed interstitial electrodes insulated from each other and defining a treating space therebetween; horizontally disposed nozzle means spaced from said electrodes and directed substantially perpendicularly theretoward; means for delivering the emulsion to be treated to said nozzle means whereby said nozzle means directs a horizontally moving stream of emulsion through the interstices of one of said electrodes, thence through said treating space and through the interstices of the other of said electrodes at such high velocity as to prevent substantial separation of the emulsion constituents in said treating space; means for impressing a large potential difference between said electrodes to establish an electric field in said treating space; and walls defining a separating chamber into which the emulsion constituents are discharged in substantially unseparated condition after moving from said treating space.

2. In an electric treater for treating emulsions, the combination of: a tank containing a body of liquid; means for introducing the emulsion to be treated into said tank in a tangential direction whereby said body of liquid is rotated; a plurality of screen electrodes disposed transverse to the flow of said liquid in said tank and positioned in spaced relationship with the axis about which said liquid rotates whereby a portion of said liquid is moved through said screens in succession; and means for establishing a potential difference between said screens whereby one or more electric fields is set up therebetween.

3. In an electric treater for treating emulsions, the combination of: a primary series of vertically-disposed interstitial electrodes comprising a plurality of substantially parallel interstitial electrodes electrically connected together; a secondary series of vertically-disposed interstitial electrodes comprising a plurality of substantially parallel interstitial electrodes electrically connected together and interspaced between the interstitial electrodes of said primary series; means for electrically insulating said primary series from said secondary series; means for impressing a potential difference between said primary and secondary series whereby a plurality of electric fields are established; and a high-velocity discharge means directing a horizontally-moving stream of emulsion through all of said electrodes, said means including a horizontally-disposed nozzle positioned to direct a stream of emulsion successively through all of said electric fields to coalesce the dispersed phase of said emulsion, the velocity of said stream being sufficiently high to prevent any substantial gravitational separation of said coalesced phase in any of said fields whereby substantially the same constituents move through all of said fields.

4. In an electric treater, the combination of: an interstitial electrode; a deflector adjacent the periphery of said interstitial electrode; means for directing a stream of emulsion toward said interstitial electrode, said deflector moving said emulsion through the interstices of said electrode; and means for establishing an electric field adjacent said interstitial electrode and through which said emulsion moves after moving through said interstices.

5. In an electric treater, the combination of: a pair of interstitial electrodes positioned in the path of a flowing stream of emulsion; a deflector adjacent the periphery of each interstitial electrode and guiding emulsion through the interstices of said electrodes; and means for establishing an electric field between said interstitial electrodes and through which said flowing stream of emulsion passes.

6. A combination as defined in claim 5 in which each of said deflectors extends only partially around its corresponding interstitial electrode, and in which the deflectors of said pair of interstitial electrodes are on opposite sides thereof whereby one deflector acts to deflect the stream of emulsion in one direction and the other deflector acts to deflect the stream of emulsion in the opposite direction.

7. In an electric treater for emulsions, the combination of: a tank containing a body of liquid; a mixing tube in said body of liquid; nozzle means electrically connected to said mixing tube and injecting a stream of emulsion thereinto whereby a portion of said body of liquid is drawn into said mixing tube along with said stream of emulsion; and means for establishing an electric field beyond the discharge end of said mixing tube and into which passes said emulsion and said liquid drawn into said mixing tube, said means comprising an electrode means including a pair of electrodes spaced from said mixing tube, and a potential supply means electrically connected thereto and to said mixing tube whereby electric fields are set up both between said electrodes and between the mixing tube and the foremost portion of said electrode means.

8. A method of treating an emulsion by the use of an interstitial electrode, which method includes the steps of: establishing an electric field on opposite sides of said interstitial electrode; moving a stream of emulsion first through one of said electric fields, then through the equipotential spaces of said interstitial electrode, and then through the field on the opposite side of said interstitial electrode; and maintaining the velocity of said emulsion sufficiently high as it moves through said fields to prevent any substantial separation of the constituent phases of said emulsion in said electric fields.

9. In an electric treater, the combination of: a tank; means for rotating a body of liquid in said tank and about a vertical axis; a plurality of vertically disposed interstitial electrodes spaced from each other and positioned at a section spaced from said vertical axis and substantially transverse to the direction of movement of said liquid whereby a portion of said liquid flows successively through said interstitial electrodes and through the space therebetween; and means for building up a potential difference between said electrodes to set up a high intensity electric field in said space.

10. In an electric treater for emulsions, the combination of: a tank; a plurality of rings smaller than said tank and spaced from each other in said tank about a common axis, said axis being to one side of the axis of said tank; a plurality of screen electrodes, one screen electrode extending across each ring; means for mounting said rings; means for flowing a stream of emulsion through said rings and their associated screen electrodes in succession; and means for establishing electric fields in the spaces between said electrodes, said tank forming a relatively large settling chamber beyond the last electrode and in which the phases of said emulsion may separate.

11. In an electric treater for treating emulsions, the combination of: a tank filled with treated emulsion constituents undergoing separation; a first deflector in said tank and submerged in the emulsion constituents therein; means for moving a stream of emulsion toward said first deflector in substantially a horizontal direction, said deflector being angled with respect to said stream of emulsion to deflect said stream to move in a given direction; a second deflector in said tank and submerged in the emulsion constituents therein and positioned to be contacted by said stream of emulsion after it is deflected by said first deflector and when said stream is moving in said given direction, said second deflector being angled with respect to the direction of flow of said stream moving in said given direction to deflect said stream from said given direction; means for maintaining a potential difference between said deflectors to coalesce the dispersed phase of said emulsion, said coalesced phase separating from the other phase after moving into the body of emulsion constituents in said tank; and means for separately withdrawing the phases of said emulsion from said tank.

12. In an electric treater for emulsions, the combination of: a plurality of rings spaced from each other about a common axis; a plurality of screen electrodes, one screen electrode extending across each ring; means for mounting said rings; means for flowing a stream of emulsion through said rings and their associated screen electrodes in succession; deflector means secured to each ring and guiding said emulsion through said screen electrodes; and means for establishing electric fields between said electrodes.

JOHN T. WORTHINGTON.